(12) United States Patent
Cerocchi

(10) Patent No.: US 10,946,783 B2
(45) Date of Patent: Mar. 16, 2021

(54) TRANSPORT TRAILER

(71) Applicant: David Cerocchi, Riddells Creek (AU)

(72) Inventor: David Cerocchi, Riddells Creek (AU)

(*) Notice: Subject to any disclaimer, the term of this patent is extended or adjusted under 35 U.S.C. 154(b) by 34 days.

(21) Appl. No.: 16/361,738

(22) Filed: Mar. 22, 2019

(65) Prior Publication Data

US 2019/0291628 A1  Sep. 26, 2019

(51) Int. Cl.
*B60P 3/08* (2006.01)
*B60P 3/07* (2006.01)
B60P 3/06 (2006.01)
B61D 3/18 (2006.01)

(52) U.S. Cl.
CPC .......... *B60P 3/08* (2013.01); *B60P 3/07* (2013.01); *B60P 3/062* (2013.01); *B60P 3/064* (2013.01); *B61D 3/182* (2013.01)

(58) Field of Classification Search
CPC .... B60P 3/08; B60P 3/07; B60P 3/062; B60P 3/064; B60P 1/433; B61D 3/182
USPC .............................. 410/24, 24.1, 25–28, 29.1
See application file for complete search history.

(56) References Cited

U.S. PATENT DOCUMENTS

| | | | | |
|---|---|---|---|---|
| 3,084,970 A * | 4/1963 | Day | ................. | B60P 3/08 410/29.1 |
| 3,100,124 A * | 8/1963 | Demos | .................. | B60P 3/08 410/24.1 |
| 6,497,541 B2 * | 12/2002 | Pawluk | ................. | B60P 3/08 410/26 |
| 6,857,833 B1 | 2/2005 | Rains et al. | | |
| 6,893,205 B2 | 5/2005 | Heim | | |
| D525,918 S | 8/2006 | LaBrie | | |
| 7,140,820 B2 * | 11/2006 | Chang | ................. | B60P 3/08 410/24.1 |
| 2007/0189872 A1 * | 8/2007 | Omuta | ................. | B60P 3/08 410/24 |

* cited by examiner

*Primary Examiner* — Stephen T Gordon
(74) *Attorney, Agent, or Firm* — Craft Chu PLLC; Andrew W. Chu

(57) ABSTRACT

A transport trailer includes an elongated body having spaced vertical supports for vertical actuators, a lower deck extending along and supported by the elongated body, and an upper deck supported by the vertical actuators. The upper deck is movable along the vertical supports via the vertical actuators. The upper deck can be lowered to a position to be substantially superimposed on top of the lower deck by the vertical actuators.

10 Claims, 5 Drawing Sheets

TRANSPORT TRAILER

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a transport trailer, in the embodiment being a vehicle transporter trailer.

2. Description of Related Art Including Information Disclosed Under 37 CFR 1.97 and 37 CFR 1.98

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

BRIEF SUMMARY OF THE INVENTION

According to a first aspect, the present invention provides a transport trailer comprising:

an elongated body having spaced vertical supports for vertical actuators, a lower deck extending along and supported by the elongated body, an upper deck supported by the vertical actuators, the upper deck being movable along the vertical supports via the vertical actuators wherein the upper deck can be lowered to a position to be substantially superimposed on top of the lower deck by the vertical actuators.

In another embodiment, the vertical actuators are telescopic hydraulic cylinders.

In another embodiment, the vertical supports are disposed spaced along each side of the trailer with the lower deck and upper deck therebetween, wherein each vertical support has a corresponding aligned vertical support at the other side of the trailer.

In another embodiment, the upper deck comprises a plurality of sections, wherein the corner of each section is supported by a respective vertical actuator and vertical support.

In another embodiment, each section of the upper deck is lockable in a desired position along its respective vertical supports.

In another embodiment, the upper deck comprises a front upper section, a middle upper section and a rear upper section, wherein the sections are movable independently of each other.

In another embodiment, the assembly further includes a headrack for providing storage space above a prime mover cabin.

In another embodiment, the front upper section comprises a movable platform which can be moved in the horizontal direction between the front upper section and the headrack.

In another embodiment, the headrack comprises drive means and locking means for the movable platform.

In another embodiment, the vertical supports comprise a series of spaced apertures, wherein the upper deck sections each include lock pins which are movable into and out of the apertures for locking the respective upper deck section into the desired vertical position along the respective vertical supports.

In another embodiment, the lower deck comprises a front lower section, a middle lower section and a rear lower section, wherein the middle lower section is movable vertically and starts from a lowered position.

In another embodiment, the middle lower section can be raised to join the rear lower section to the front lower section.

In another embodiment, the middle lower section can be moved to its lowered position.

In another embodiment, the lower deck includes a movable second platform which is initially laid flat along the rear lower section.

In another embodiment, a front portion of the second platform can be raised and the second platform can be translated forward and backwards along the middle lower section and the rear lower section.

Other aspects of the invention are also disclosed.

BRIEF DESCRIPTION OF THE SEVERAL VIEWS OF THE DRAWINGS

Notwithstanding Any other forms which may fall within the scope of the present invention, preferred embodiments of the present invention will now be described, by way of examples only, with reference to the accompanying drawings.

DETAILED DESCRIPTION OF THE INVENTION

Figure 1:
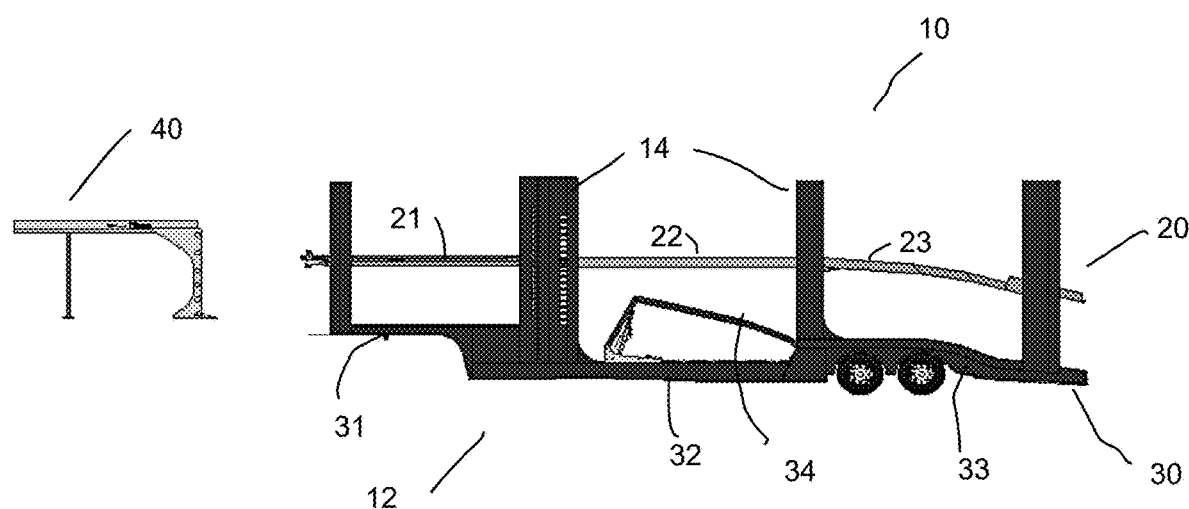
FIG. 1 shows a side elevation view of a vehicle transporter trailer according to a preferred embodiment of the present invention, with the upper deck in a raised position.

It should be noted in the following description that like or the same reference numerals in different embodiments denote the same or similar features.

Figure 2:
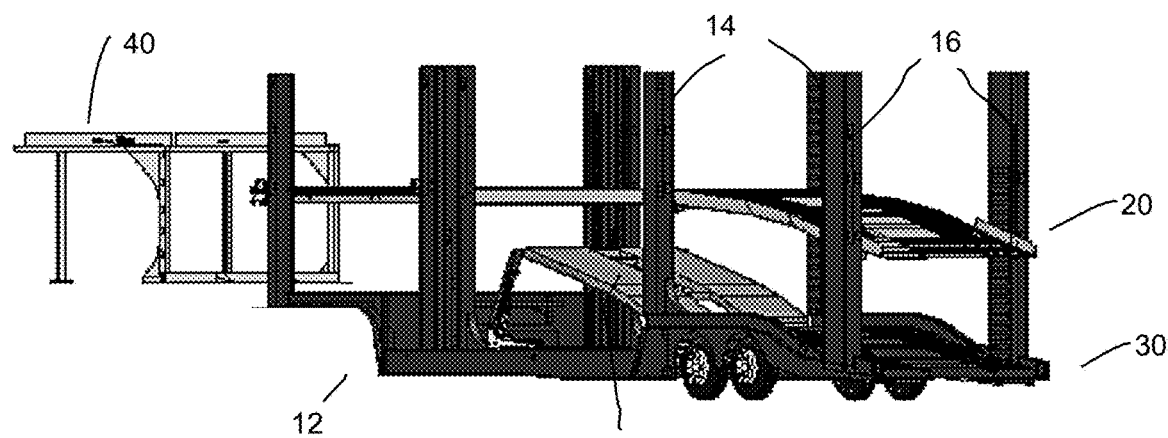
FIG. 2 shows a rear perspective view of the vehicle transporter trailer of FIG. 1.

FIGS. 1 and 2 show a vehicle transport trailer 10 according to a preferred embodiment of the present invention. The trailer 10 is typically used to ship new vehicles, such as cars and SUVs, typically from the manufacturer or importing point to auto dealerships, but can also be used for used vehicles, hire vehicles, and other vehicle types. Like other semi-trailers, commercial car carrier trailers attach to a prime mover, such as a truck, using a fifth wheel coupling.

The trailer 10 is an open commercial car carrier trailer which has a double-decker design, with both decks subdivided into a number of loading and storage ramps, where some or all of the ramps can be tilted, translated horizontally, and/or lifted independently of one another using hydraulics. The trailer hydraulics allow the ramps to be aligned on a slope, so cars can be driven up and secured to the ramp floor with chains, tie-down ratchets or wheel straps, after which the ramp can be tilted in any direction to optimize stacking.

The top deck is usually loaded first and off-loaded last. To load vehicles on the top deck of the trailer 10, the top deck can be lowered hydraulically to align with or superimpose over the lower deck, forming an easy drive-up ramp to the upper deck.

The trailer 10 comprises an elongated body 12 having spaced vertical supports 14 for vertical actuators, which in the embodiment are telescopic hydraulic cylinders 16. The trailer 10 comprises an upper deck 20 and a lower deck 30. The assembly further includes a headrack 40 to provide extra storage space mounted above the truck cabin, and which is accessible via the upper deck 20.

The vertical supports 14 are disposed spaced along a first side and a second side of the elongated body 12 of each side of the trailer 10 with the lower deck 30 and upper deck 20 therebetween. The vertical supports 14 are paired, meaning each vertical support 14 of the first side has a corresponding aligned vertical support 14 at the second side of elongated body 12 of the trailer 10.

The upper deck 20 comprises three sections, being a front upper section 21, a middle upper section 22 and a rear upper section 23. The corners of each upper section 21, 22 and 23 are supported by a respective cylinder 16 and movable vertically thereby along the vertical supports 14. The vertical supports 14 are thus disposed to correspond to the corners of each section 21 to 23. The vertical supports 14 can be made to be wide enough to support two vertical actuators thereon for actuating/moving the corners of adjacent deck sections.

Figure 3:
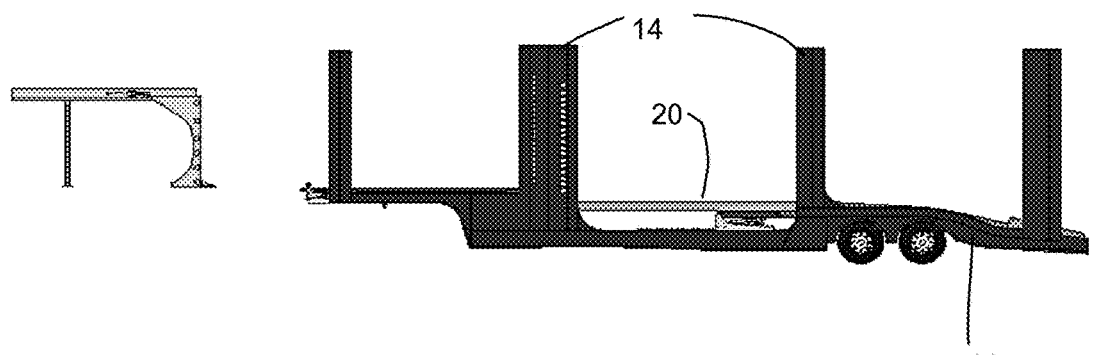
FIG. 3 shows a side elevation view of the vehicle transporter trailer, with the upper deck in a lowered position.

As shown in FIG. 3, the upper deck 20 can be lowered into a position at which it is superimposed over the lower deck 30. In other words, the upper deck 20 is lowered to be of a height which is similar or the same as that of the lower deck 30, or on top of the lower deck 30. This provides a substantially reduced height and incline for loading the upper deck compared to prior art trailers.

Figure 4:
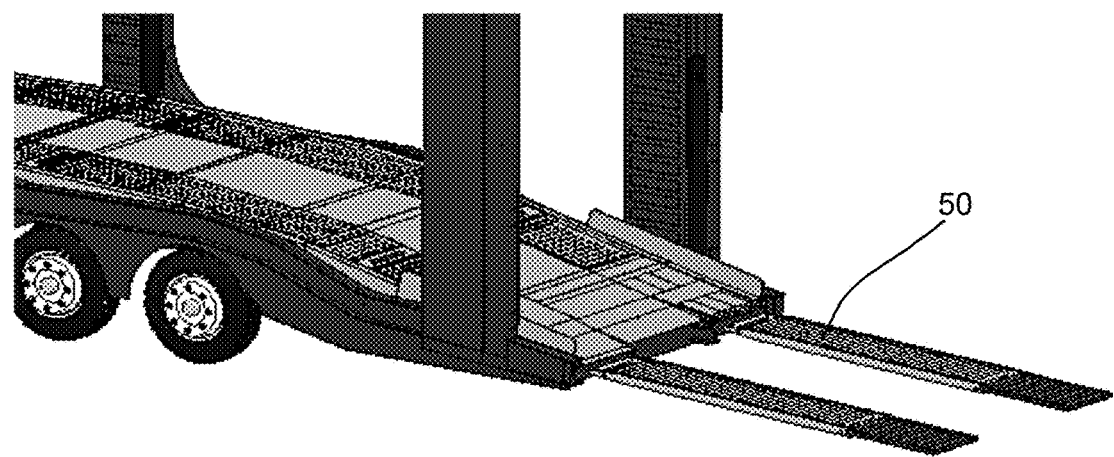
FIG. 4 shows a rear perspective view of the deployed rear loading ramp.

FIG. 4 shows the extension of a loading ramp 50 at the rear end of the trailer 10. The loading ramp 50 is arranged to provide a reduced entry angle creating greater ground clearance for safe damage free loading of vehicles.

Figure 5:
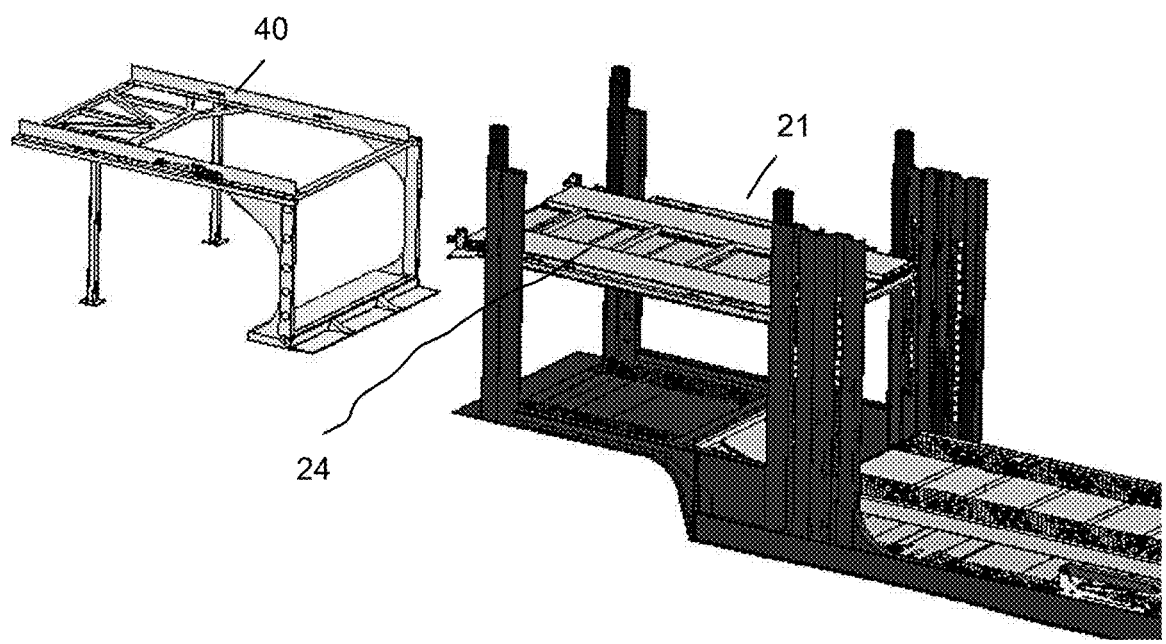
FIG. 5 shows another perspective view of the raised front section of the upper deck of the trailer.

As shown in FIG. 5, a first vehicle can be loaded to the upper deck 20 via the loading ramp 50, to the front upper section 21 thereof. The front upper section 21 is then raised by its cylinders 16 to a level aligned with the headrack 40.

Figure 6:
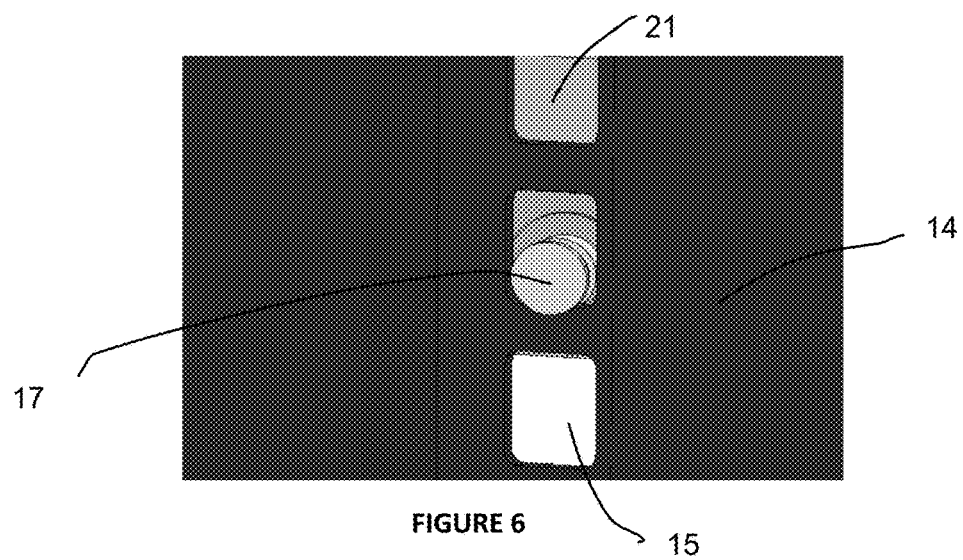
FIG. 6 shows an enlarged perspective view of a rack vertical position locking means.

As shown in FIG. 6, the vertical supports 14 comprise a series of spaced apertures 15. The upper sections 21 to 23 each include lock pins 17 which are movable into and out of the apertures 15 for locking the respective section 21 to 23 into the desired vertical position along the vertical support 14. In the embodiment, the lock pins 17 are movable via hydraulics but other means can also be used such as electrical or mechanical actuator means.

Figure 7:
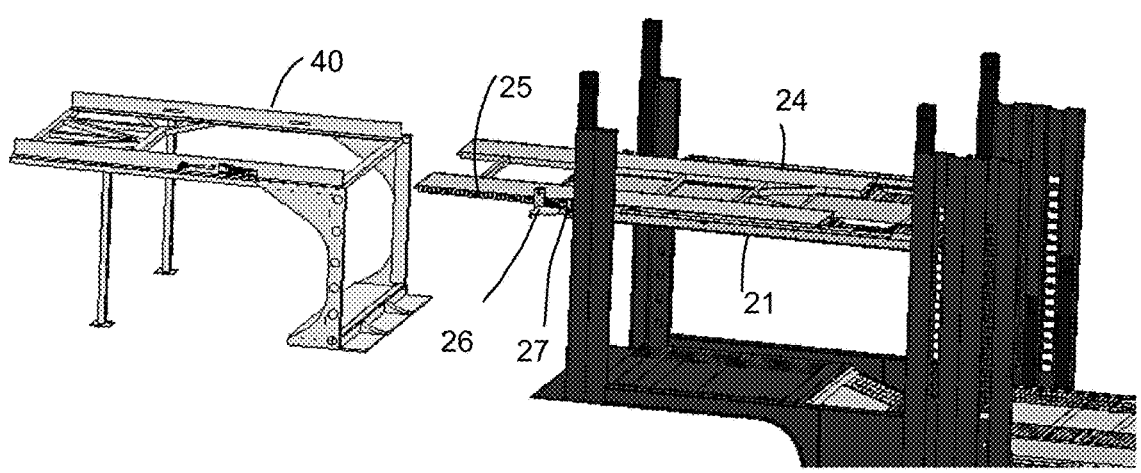
FIG. 7 shows a perspective view of the moving of the movable platform of the front section of the upper deck towards the headrack.
Figure 8:
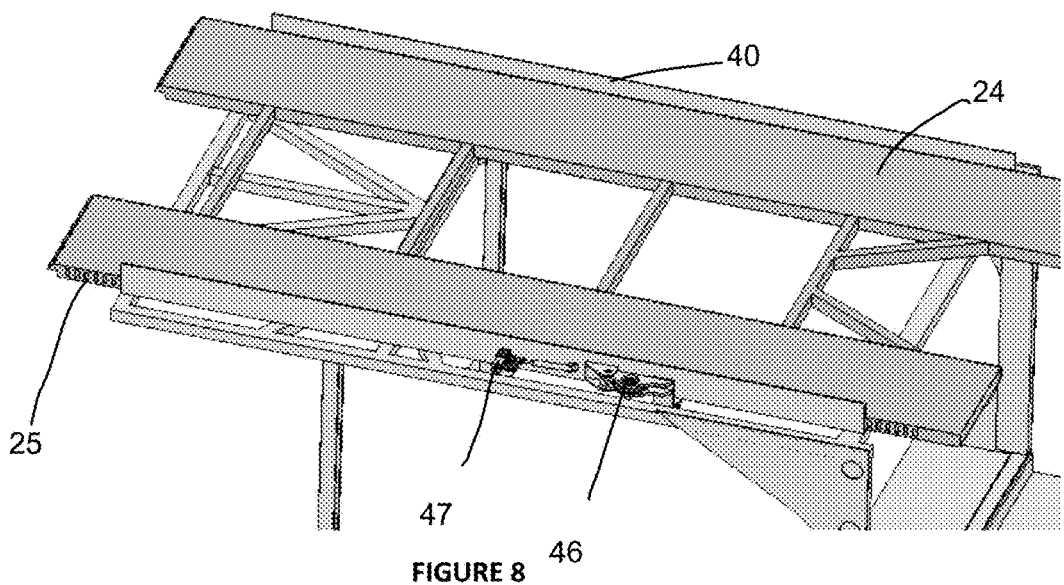
FIG. 8 shows a perspective view of the movable platform of the upper deck positioned in the headrack.

As shown in FIGS. 7 and 8, the front upper section 21 comprises a movable first platform 24 which can be moved in the horizontal direction via suitable moving means. The first vehicle is placed onto the platform 24. The moving means can comprise a rack and pinion arrangement between the platform 24 and the front upper section 21. The platform 24 for example includes a series of spaced holes 25 at side edges thereof and the front upper section 21 can include a drive gear 26 to engage the holes 25 and effect horizontal movement of the platform 24. The front upper section 21 can additionally include a lock pin 27, hydraulically driven or otherwise, to engage one of the holes 25 for locking the horizontal position of the platform 24 along the front upper section 21.

As shown in FIG. 8, the headrack 40 similarly comprises a drive gear 46 for assisting and taking over drive of the platform 24 from the front upper section 21, and a movable lock pin 47 for locking the platform 24 to the headrack 40. This retains the first vehicle to the headrack 40. The front upper section 21 can then be returned to its lowered position to the lower deck 30 to receive a second vehicle. Once the second vehicle is received, the front upper section 21 can then be raised again. The drive gear 46 can be used to return the platform 24 from the headrack 40 to the front upper section 21 when unloading the first vehicle.

Third and fourth vehicles can then be loaded onto the middle upper section 22 and the rear upper section 23. These sections 22 and 23 are then raised via their respective cylinders 16 along the vertical supports 14. The height of the upper deck 20 can be varied along the vertical supports 14 and the positions thereof securely locked to the supports 14. The entire upper deck 20 is thus in its raised position which exposes the lower deck 30 and allows vehicles to be loaded thereon. The upper deck sections 21, 22 and 23 can be raised and lowered independently of each other, which allows these sections to be at their respective lowest heights depending on the height of the vehicles loaded below them. This allows the center of gravity of the trailer 10 to be optimally lowered for transport.

As shown in FIGS. 1 to 3, the lower deck 30 comprises a raised front lower section 31, a sunken middle lower section 32 and a rear lower section 33. The front lower section 31 is raised to provide space to receive the prime mover fifth wheel coupling underneath.

The lower deck 30 is configured to receive four vehicles thereon (fifth to eighth vehicles), with the middle two vehicles being in a semi-stacked arrangement.

Figure 9:
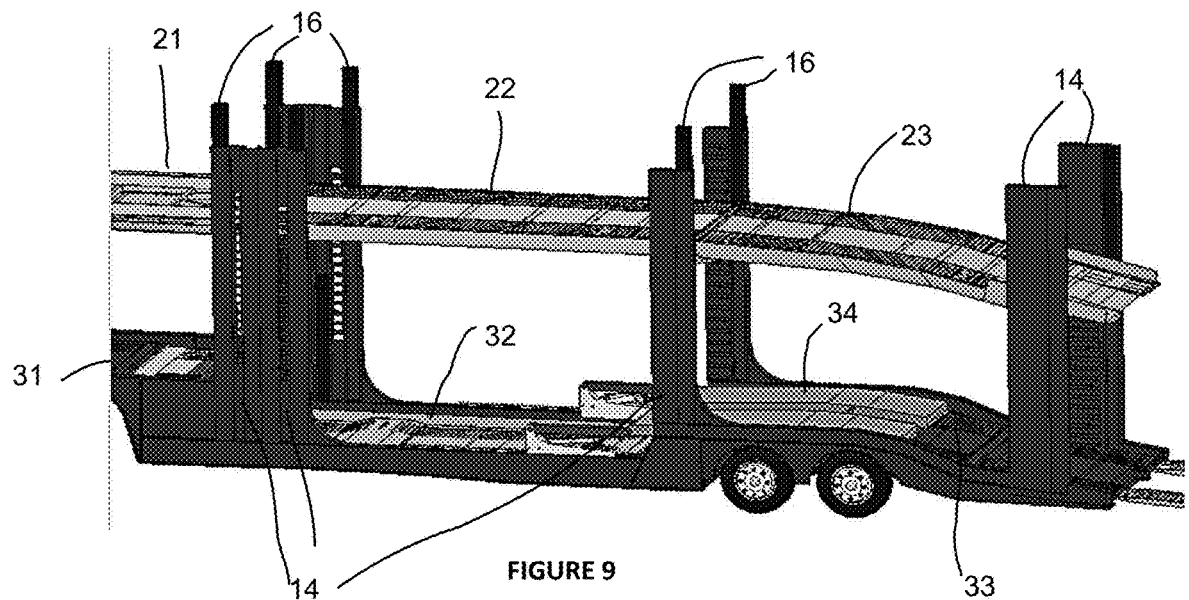
FIG. 9 shows a perspective view of the middle and rear sections of the upper deck raised.
Figure 10:
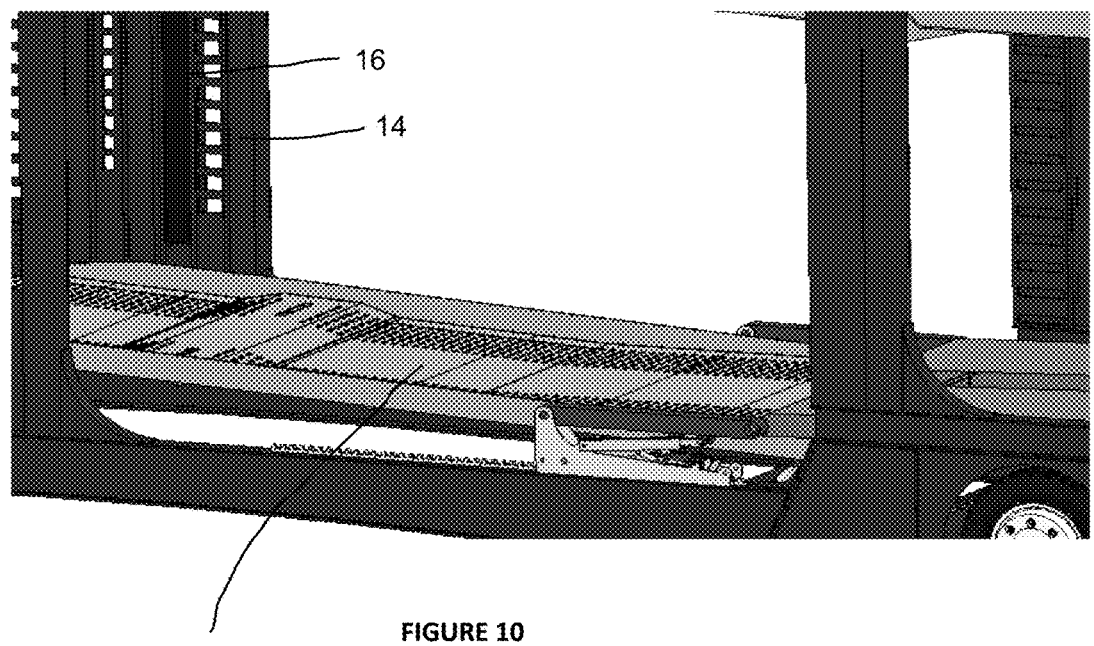
FIG. 10 shows a perspective view of the middle section of the lower deck raised.

As shown in FIG. 9, the middle lower section 32 is movable vertically and starts from a lowered position. The middle lower section 32 is raised to join the rear lower section 33 to the front lower section 31. Any gaps between the front lower section 31 and the middle lower section 32 can be bridged by movable panels. A fifth vehicle can then be then loaded onto the front lower section 31 via the loading ramp 50. As shown in FIG. 10, a sixth vehicle can then be loaded onto the middle lower section 32.

Figure 11:
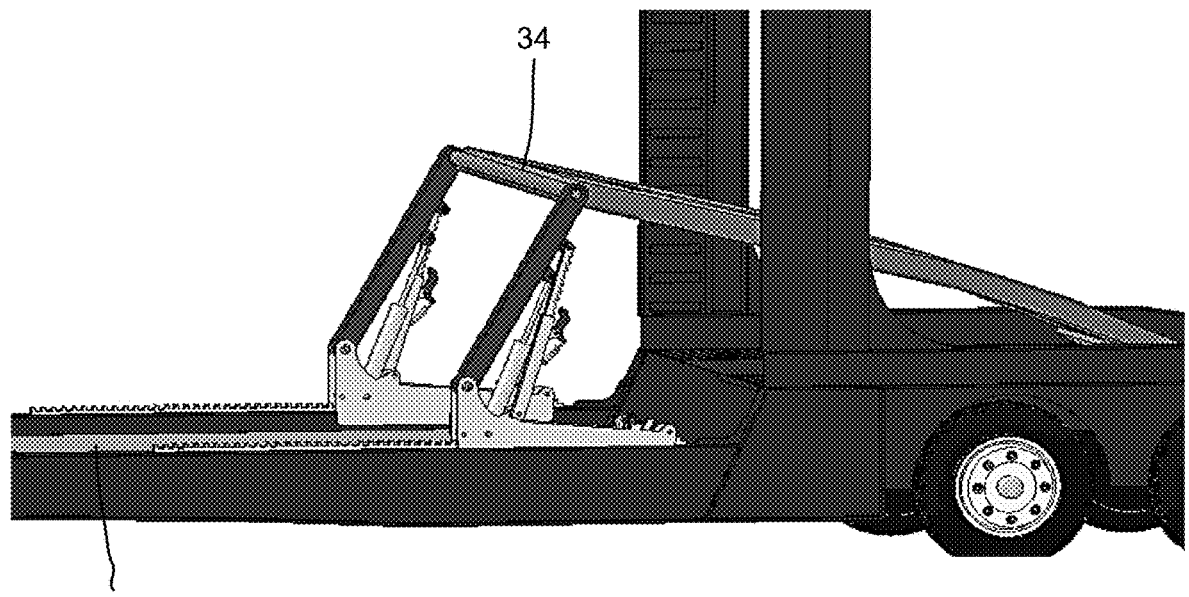
FIG. 11 shows a perspective view of the middle section of the lower deck lowered and the movable section of the lower deck moved and tilted.
Figure 12:
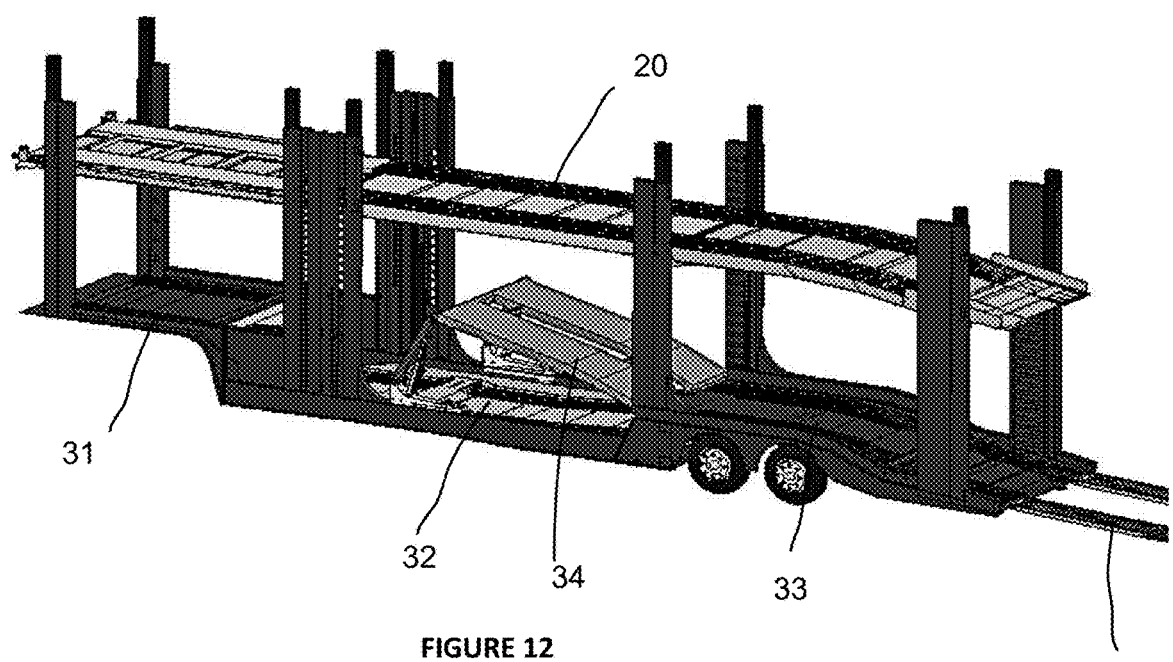
FIG. 12 shows a perspective view of the movable section of the lower deck moved over the middle section of the lower deck.

As shown in FIGS. 11 and 12, the middle lower section 32 is then moved to its lowered position which creates space. The lower deck 30 includes a movable platform 34 which is initially laid flat along the rear lower section 33. A seventh vehicle can then be loaded onto the platform 34. A front portion of the platform 34 can be raised (for example via hydraulic means), and the platform 34 can be translated forward and backwards (for example via a pinion and gear arrangement) along tracks in the middle lower section 32 and the rear lower section 33. This allows the seventh vehicle to be partly stacked above the sixth vehicle in the middle lower section 32. An eighth vehicle can then be loaded onto the rear lower section 33. The ramp 50 can then be retracted. To unload the vehicles at the destination, the order of vehicles is reversed.

Trailer hydraulics are operated using a control box mounted on the trailer itself.

The present invention thus provides a number of advantages including:

Standardization of all components.
A Safer and more User friendly design concept.
Lower Flat deck heights to assist in tying down of Vehicles.
Greater Overall Width Capacity to suit the newer commercial Vehicles.
Greater Maximum lifting deck heights to Assist in easy safe loading of higher Vehicles.
Better angle of approach for Easy Damage Less Loading.
Better Transition Decks for Safe Loading
Maintenance friendly removal and replacement of equipment.
Readily available standard replacement parts off the shelf.
Easy removal and replacement of equipment to lower Maintenance Costs
No use of cables to raise or lower any decks
Movable platform 34 is fully adjustable in the up, down, forward and backward directions with the full weight of the vehicle thereon
Self-rotating locking pins for deck
The lock pins can include a peripheral projection which when the pin is rotated, the projection acts as a safety lock as it engages the vertical support Although a preferred embodiment of the present invention has been described, it will be apparent to skilled persons that modifications can be made to the embodiment shown.

The vertical actuators defined herein can be embodied in other forms that provide the vertical movement of the upper deck sections. These actuator can include mechanical or pneumatic actuators for example.

The vertical supports can also be made to be less than vertical if desired, to be at a small acute angle for example.

The invention can also be used for palleted goods and not just vehicles.

I claim:

1. A transport trailer, comprising:
an elongated body having spaced vertical supports;
vertical actuators with respective ones of said spaced vertical supports;
a lower deck extending along and supported by said elongated body;
an upper deck being supported by said vertical actuators and being movable along said vertical supports via said vertical actuators,
wherein said upper deck has an upper deck lowered position superimposed on top of said lower deck by said vertical actuators,
wherein said upper deck comprises a plurality of sections, wherein each section has a corner supported by a respective ones of said vertical supports with a corresponding ones of said vertical actuators, and
wherein said plurality of sections of said upper deck is comprised of a front upper section, a middle upper section and a rear upper section, wherein each section is movable independently of each other;
a headrack connected to said elongated body so as to provide storage space; and
a movable first platform being engaged to said front upper section and being moveable in a horizontal direction between said front upper section and said headrack,
wherein said headrack comprises drive means connected to said movable first platform; and locking means for said movable platform.

2. The trailer of claim 1 wherein said vertical actuators are comprised of telescopic hydraulic cylinders.

3. The trailer of claim 1 wherein said elongate body has a first side and a second side opposite said first side,
wherein said vertical supports disposed along said first side and along said second side, said lower deck and said upper deck extending between said first side and said second side, and wherein each vertical support on said first side has a corresponding ones of said vertical supports aligned on said second side.

4. The trailer of claim 1, wherein each section of said upper deck has a locked position along said respective vertical supports.

5. The trailer of claim 1, wherein each vertical support is comprised of a series of spaced apertures vertically along each vertical support, and a lock pin removeably engaged to ones of said spaced apertures so as to lock a respective ones of said sections into a desired vertical position.

6. The trailer of claim 1, wherein said lower deck comprises a front lower section, a middle lower section and a rear lower section, wherein said middle lower section has a lower deck lowered position, said middle lower section being movable from said lower deck lowered position.

7. The trailer of claim 6, wherein said middle lower section has a lower deck raised position above said lower deck lowered position so as to align said rear lower section and said front lower section.

8. The trailer of claim 7, wherein said middle lower section is moveable between said lower deck raised position and said lower deck lowered position.

9. The trailer of claim 6, further comprising: a movable second platform being engaged to said lower deck with a flat position along said rear lower section and being movable from said flat position.

10. The trailer of claim 9, wherein said movable second platform is comprised of a front portion, said front portion having a raised position above said flat position, and wherein said movable second platform is translatable back and forth between said middle lower section and said rear lower section.

* * * * *